United States Patent
Lee et al.

(10) Patent No.: US 10,015,032 B2
(45) Date of Patent: Jul. 3, 2018

(54) METHOD AND STRUCTURE FOR ACQUIRING FREQUENCY HOP TIMING SYNCHRONIZATION FOR FH-FDMA SATELLITE COMMUNICATION SYSTEM

(71) Applicants: Juhyung Lee, Seoul (KR); Byunggak Jo, Daejeon (KR); Chulhee Choi, Dangjin-si (KR); Dhongwoon Jang, Daejeon (KR); Yeesoo Han, Daejeon (KR)

(72) Inventors: Juhyung Lee, Seoul (KR); Byunggak Jo, Daejeon (KR); Chulhee Choi, Dangjin-si (KR); Dhongwoon Jang, Daejeon (KR); Yeesoo Han, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 15/334,468

(22) Filed: Oct. 26, 2016

(65) Prior Publication Data

US 2017/0141939 A1    May 18, 2017

(30) Foreign Application Priority Data

Nov. 12, 2015    (KR) .......... 10-2015-0159101

(51) Int. Cl.
*H04W 4/00*    (2018.01)
*H04L 27/26*    (2006.01)
(Continued)

(52) U.S. Cl.
CPC ......... *H04L 27/2602* (2013.01); *H04B 1/713* (2013.01); *H04B 1/7156* (2013.01); *H04B 7/15* (2013.01); *H04L 5/0048* (2013.01)

(58) Field of Classification Search
CPC ... H04W 76/023; H04W 24/02; H04W 48/16; H04W 8/005; H04W 88/06
(Continued)

(56) References Cited

U.S. PATENT DOCUMENTS

| | | | |
|---|---|---|---|
| 3,879,580 A * | 4/1975 | Schlosser | H04B 7/2125 370/324 |
| 2003/0067901 A1* | 4/2003 | Schein | H04W 48/12 370/337 |

(Continued)

FOREIGN PATENT DOCUMENTS

| | | |
|---|---|---|
| JP | 2003-051769 A | 2/2003 |
| KR | 10-2012-0126636 A | 11/2012 |
| KR | 10-2012-0127008 A | 11/2012 |

*Primary Examiner* — Andrew Chriss
*Assistant Examiner* — Atique Ahmed
(74) *Attorney, Agent, or Firm* — Scully Scott Murphy and Presser (57) ABSTRACT

A method of acquiring frequency hop timing synchronization includes a propagation delay time computation process of computing a minimum and maximum propagation delay times according to an error of a location of a satellite communication terminal, which is input by an operator of a ground satellite terminal, and a delay transmission process of transmitting a ranging signal after a certain time upon the transmission of the ranging signal through a ranging-dedicated hop group having a hop duration time that is set in consideration of the maximum propagation delay, the minimum propagation delay, a ranging time, and a timing error due to a positional change of a satellite, in order to avoid collisions between the ranging signal and other signals. The satellite communication terminal may receive a ranging signal that was transmitted by the satellite communication terminal and control a timing for determining whether synchronization is acquired and a timing for performing transmission.

7 Claims, 7 Drawing Sheets

(51) Int. Cl.
  *H04B 1/713* (2011.01)
  *H04L 5/00* (2006.01)
  *H04B 1/7156* (2011.01)
  *H04B 7/15* (2006.01)

(58) Field of Classification Search
  USPC .......................................................... 370/328
  See application file for complete search history.

(56) References Cited

U.S. PATENT DOCUMENTS

| | | | |
|---|---|---|---|
| 2005/0015680 A1* | 1/2005 | Rubin | G01S 19/08 714/47.2 |
| 2006/0280199 A1* | 12/2006 | Lane | H04W 56/00 370/458 |
| 2006/0281476 A1* | 12/2006 | Lane | H04B 7/2125 455/502 |
| 2009/0219202 A1* | 9/2009 | Pon | G01S 19/42 342/357.25 |
| 2009/0318175 A1* | 12/2009 | Sandberg | H04W 56/0045 455/502 |
| 2011/0268158 A1* | 11/2011 | Miller | H04B 7/2041 375/138 |
| 2015/0131523 A1* | 5/2015 | Balter | H04B 1/715 370/317 |
| 2015/0280952 A1* | 10/2015 | Dattatreya | H04L 27/2275 375/325 |

* cited by examiner

METHOD AND STRUCTURE FOR ACQUIRING FREQUENCY HOP TIMING SYNCHRONIZATION FOR FH-FDMA SATELLITE COMMUNICATION SYSTEM

CROSS-REFERENCE TO RELATED APPLICATION

Pursuant to 35 U.S.C. § 119(a), this application claims the benefit of earlier filing date and right of priority to Korean Application No. 10-2015-0159101, filed on Nov. 12, 2015, the contents of which is incorporated by reference herein in its entirety.

BACKGROUND OF THE INVENTION

1. Field of the Invention

The present invention refers to a satellite communication terminal that controls Tx timing of a ranging signal and a control method thereof, and more particularly, to a method and structure for acquiring frequency hop timing synchronization for an FH-FDMA satellite communication system.

2. Background of the Invention

A frequency hop communication system refers to a system for performing communication while periodically changing a frequency for a Tx/Rx period. To this end, a start time point and an end time point of a frequency hop are needed to be synchronized, which is called frequency hop timing synchronization. The frequency hop timing synchronization is largely classified into coarse timing synchronization and fine timing synchronization. The coarse timing synchronization refers to approximately matching a hop timing error during a Tx/Rx period to ±0.5 hop or less. The fine timing synchronization refers to reducing the hop timing error to a synchronization error allowed by a communication system. Generally, a timing error is reduced to a synchronization error level of less than 5% of hop duration. The present invention relates to a method and structure for acquiring frequency hop timing synchronization for a satellite communication system having very large propagation delay characteristics and includes coarse timing synchronization and fine timing synchronization.

Figure 1:
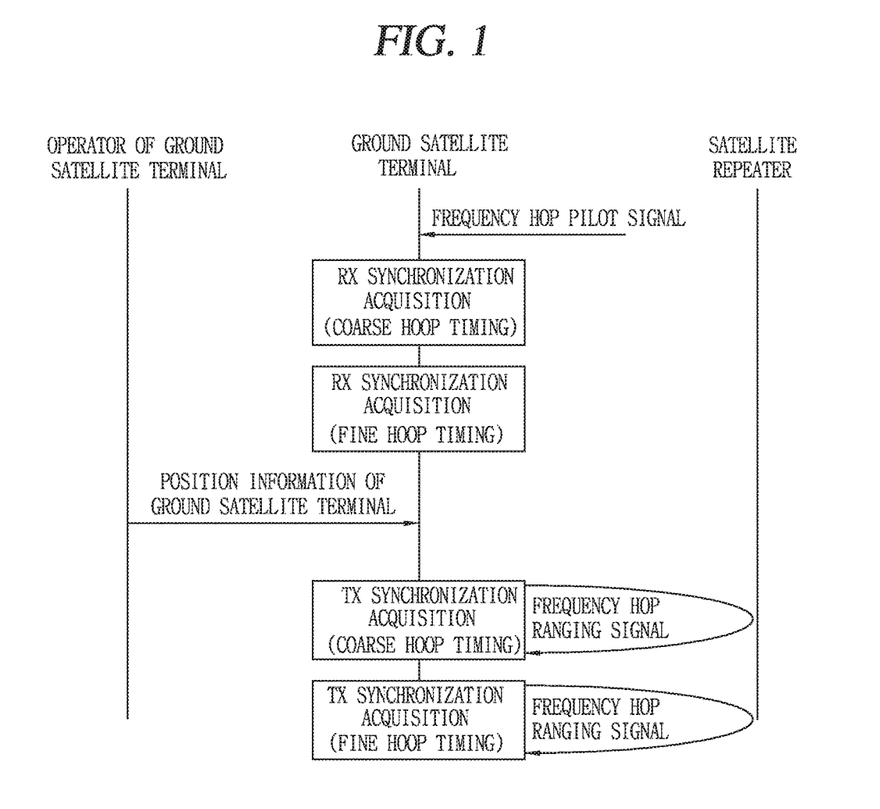
FIG. 1 shows a procedure of acquiring frequency hop timing synchronization by a ground terminal in a satellite communication system.

FIG. 1 shows a procedure of acquiring frequency hop timing synchronization by a ground satellite terminal in a satellite communication system. First, the ground satellite terminal acquires Rx frequency hop timing synchronization using a frequency hop pilot signal. After acquiring the Rx synchronization, the ground satellite terminal acquires Tx frequency hop timing synchronization by receiving a frequency hop ranging signal that was transmitted by itself.

The Tx synchronization is determined according to a propagation distance between the satellite repeater and the ground satellite terminal, and the propagation distance may vary depending on a location of the ground satellite terminal in the satellite communication system. Accordingly, when the ground satellite terminal is not aware of a propagation distance to the satellite repeater, a frequency hop signal initially transmitted by the ground satellite terminal is not a synchronized signal. Thus, a collision with a Tx signal of another satellite terminal may occur.

SUMMARY OF THE INVENTION

Therefore, an aspect of the detailed description is to allow a satellite communication terminal to control timing at which a ranging signal is transmitted.

Also, another aspect is to allow a satellite communication terminal to transmit a ranging signal without collisions with other signals.

To achieve these and other advantages and in accordance with the purpose of this specification, as embodied and broadly described herein, there is provided an FH-FDMA system in which a ranging-dedicated hop group having a slower hop rate than other hop groups is separately set to acquire uplink synchronization, the system including a propagation delay time computation process of computing a propagation delay time from a location of a satellite communication terminal to a satellite repeater and minimum and maximum propagation delay times according to an allowable error of the location; and a delay transmission process of transmitting a ranging signal after a certain time upon the transmission of the ranging signal through the ranging-dedicated hop group in order to avoid collisions between the ranging signal and other signals. The satellite communication terminal may receive the ranging signal that was transmitted by itself and control a timing for transmitting a subsequent ranging signal according to whether a synchronization error is measured and whether synchronization is acquired. A hop rate of the ranging-dedicated group may be a value obtained by adding a ranging performing time of the ground satellite terminal to a difference between a maximum propagation delay time and a minimum propagation delay time that may occur in the FH-FDMA system in consideration of beam coverage directed by an antenna of the satellite repeater of the FH-FDMA system and variation in location of the satellite repeater.

The certain time may be a difference between the maximum propagation delay time and the minimum propagation delay time, which is calculated by an allowable error range of the location input by an operator of the ground satellite terminal.

The method may further include, after the delay transmission process, a frequency dehopping process of frequency-dehopping a synchronization signal transmitted by the satellite repeater or a satellite; and a filtering process of pre-filtering and post-filtering a first signal corresponding to the frequency-dehopped synchronization signal to acquire a second signal and a third signal.

The method may further include, after the filtering process, an envelop detection process of detecting the first to third signals; normalizing each value of the envelop detection of the first to third signals using a sum of the envelop detection outputs of the second and third signals; an average computing process of computing averages of the normalized values; and a synchronization error measurement process of measuring a synchronization error based on the averages. The synchronization error measurement process may include a first synchronization measurement process of determining that coarse synchronization is acquired when the average of the normalized value of the envelop detection of the first signal is greater than a reference for determining whether the coarse synchronization is acquired; and a second synchronization measurement process of measuring the synchronization error based on the averages of the normalized values of the envelop detection of the first to third signals and determining that fine synchronization is acquired when the synchronization error is smaller than an allowable synchronization error, which is a reference for determining whether the fine synchronization is acquired.

There is also provided a satellite communication terminal for acquiring frequency hop timing synchronization including a controller configured to compute a propagation delay time from a location of the satellite communication terminal to a satellite repeater and minimum and maximum propagation delay times according to an allowable error range of the location; and a wireless communication unit configured to transmit a ranging signal after a certain time upon the transmission of the ranging signal through a dedicated-ranging hop group in order to avoid collisions between the ranging signal and other signals.

The wireless communication unit may include a frequency dehopping unit configured to frequency-dehop a synchronization signal transmitted by the satellite repeater or a satellite; a filtering unit configured to pre-filter and post-filter a first signal corresponding to the frequency-dehopped synchronization signal to acquire a second signal and a third signal; and an envelope detector configured to detect envelopes of the first to third signals. The controller may include a first synchronization measurement unit configured to determine that coarse synchronization is acquired when an average of a normalized value of envelop detection of the first signal is greater than a reference for determining whether the coarse synchronization is acquired; and a second synchronization measurement unit configured to measure a synchronization error based on averages of normalized values of envelop detection of the first to third signals and determine that fine synchronization is acquired when the synchronization error is smaller than an allowable error, which is a reference for determining whether the fine synchronization is acquired.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The aforementioned features and advantages of the present invention will become apparent from the following detailed description with respect to the accompanying drawings, and thus the technical idea of the present invention can be easily carried out by those skilled in the art. Since the present invention may be variously modified and have several exemplary embodiments, specific exemplary embodiments will be shown in the accompanying drawings and described in detail in the detailed description. However, it is to be understood that the present invention is not limited to the specific exemplary embodiments, but includes all modifications, equivalents, and substitutions included in the spirit and the scope of the present invention. The terminology used herein is merely for the purpose of describing particular embodiments, and is not intended to limit the scope of the present invention.

The present invention proposes a satellite communication terminal that controls Tx timing of a ranging signal and a control method thereof. In detail, the present invention relates to a reality synchronization acquisition method and structure for a ground satellite communication terminal in an FH-FDMA satellite communication system that operates multiple hop groups.

Hereinafter, a satellite communication terminal that controls Tx timing of a ranging signal and a control method thereof according to the present invention will be described in more detail with reference to the drawings.

Figure 2:
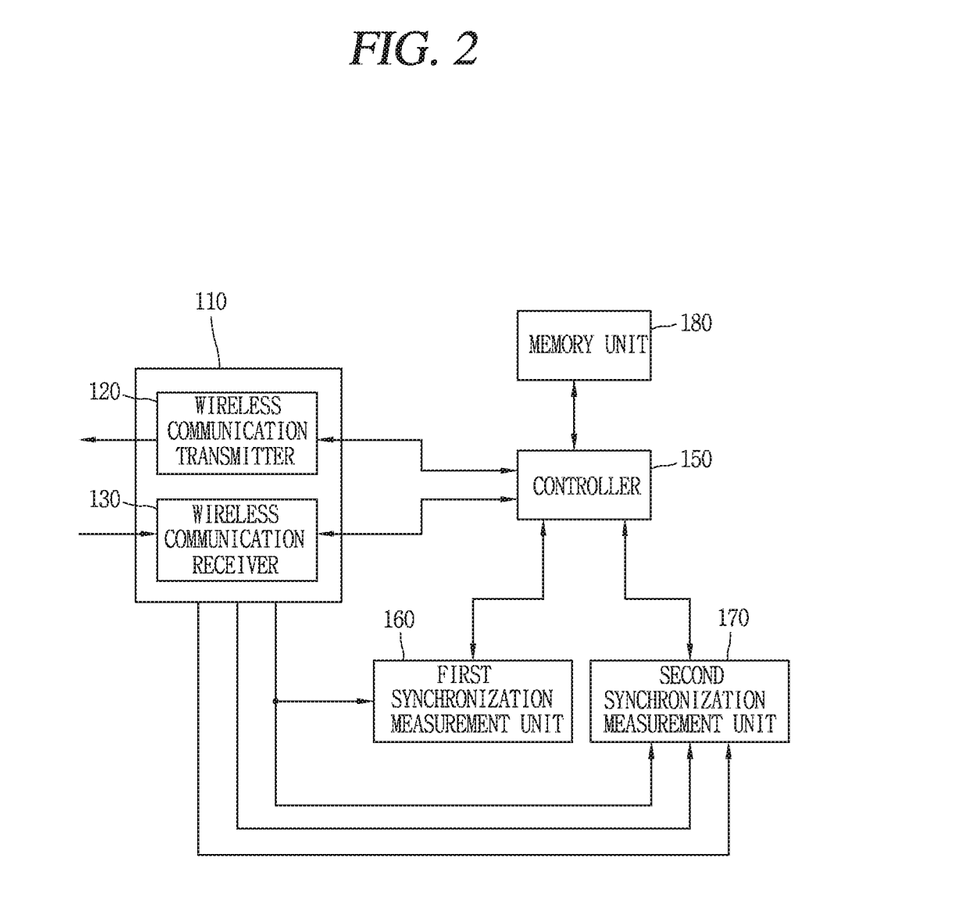
FIG. 2 is a diagram showing a detailed configuration of a satellite communication terminal that controls Tx timing of a ranging signal according to the present invention.
Figure 3:
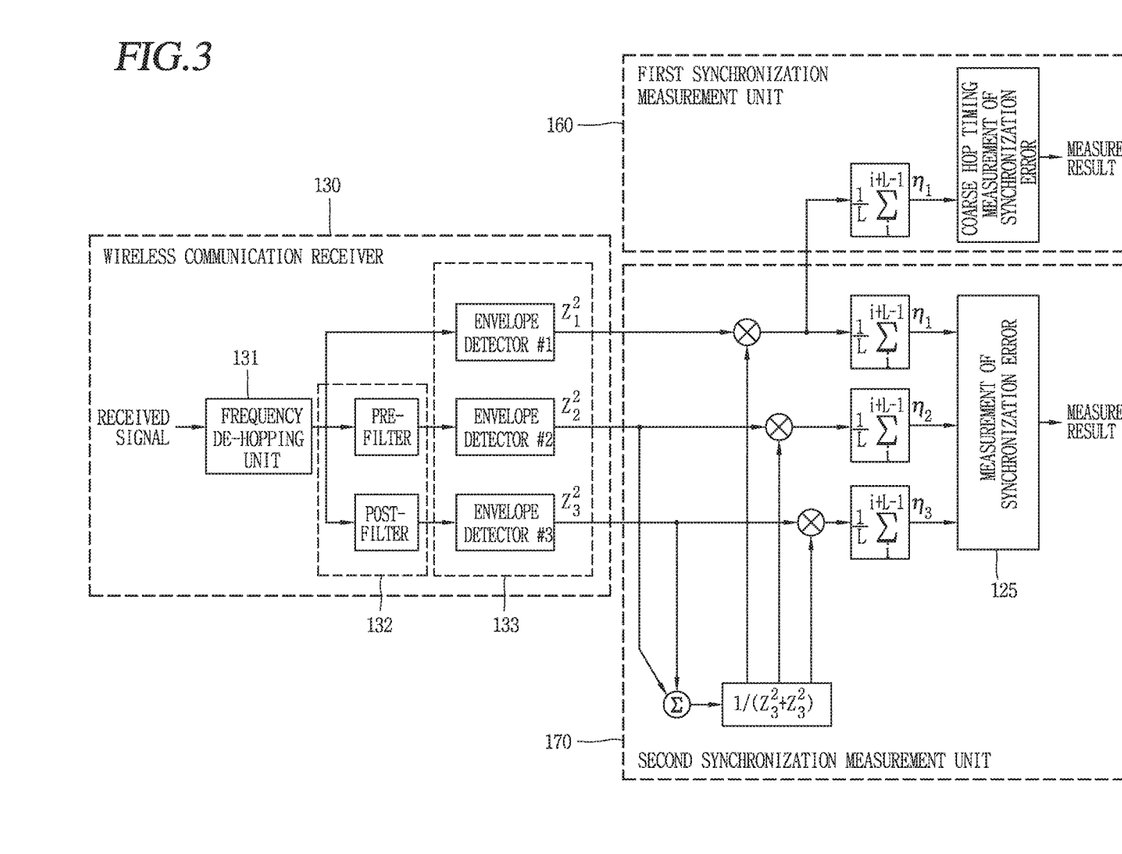
FIG. 3 is a detailed block diagram of a wireless communication unit, a first synchronization measurement unit, and a second synchronization measurement unit, which control Tx timing of a ranging signal in a satellite communication terminal according to the present invention.

In this regard, FIG. 2 is a diagram showing a detailed configuration of a satellite communication terminal that controls Tx timing of a ranging signal according to the present invention. As shown in FIG. 2, a satellite communication terminal 100 includes a wireless communication unit 110, a controller 150, and a memory unit 180. FIG. 3 is a detailed block diagram of a wireless communication unit, a first synchronization measurement unit, and a second synchronization measurement unit, which control Tx timing of a ranging signal in a satellite communication terminal according to the present invention.

The wireless communication unit 110 may include a wireless communication transmitter 120 and a wireless communication receiver 130.

The wireless communication transmitter 120 transmits a ranging signal after a certain time upon the transmission of the ranging signal through a ranging-dedicated hop group in order to avoid collisions between the ranging signal and other signals. The certain time may be a difference between a maximum propagation delay time and a minimum propagation delay time, which is calculated by an allowable error range of the location input by an operator of the ground satellite terminal.

Referring to FIG. 3, the wireless communication receiver 130 receives a frequency hop signal and performs signal processing on the received frequency hop signal.

The wireless communication receiver 130 includes a frequency dehopping unit 131, a filtering unit 132, and an envelope detector 133.

The frequency dehopping unit 131 frequency-dehops a synchronization signal that is transmitted by the satellite repeater or a satellite. Accordingly, the frequency-dehopped synchronization signal is a synchronization signal having a fixed frequency before the frequency dehopping.

The filtering unit 132 pre-filters and post-filters a first signal corresponding to the frequency-dehopped synchronization signal to acquire a second signal and a third signal. That is, an input frequency hop signal is dehopped to form a fixed frequency signal, and then Rx signal energy $z_1^2 \sim z_3^2$ is calculated by three envelope detectors 133.

The envelope detectors 133 perform envelope detection on the first to third signals.

Figure 4:
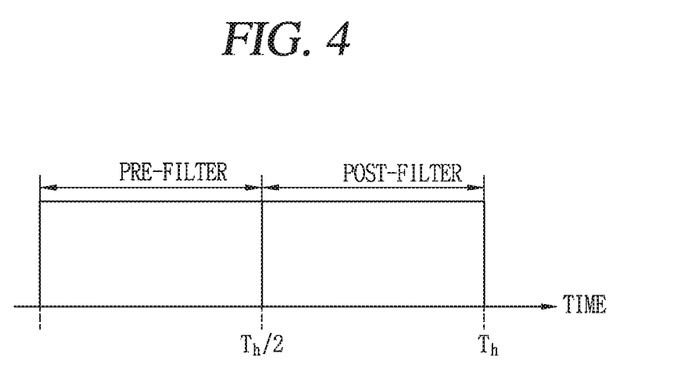
FIG. 4 shows a time section including a pre-processing section and a post-processing section according to an embodiment of the present invention.

In this regard, FIG. 4 shows a time section including a pre-processing section and a post-processing section according to an embodiment of the present invention.

The controller 150 computes a propagation delay time from a location of the satellite communication terminal 100, which is input by an operator of the ground satellite terminal, to the satellite repeater and also computes the minimum propagation delay time and the maximum propagation delay time according to an allowable error range of the location. A first synchronization measurement unit 160 measures a coarse synchronization error, and a second synchronization measurement unit 170 measures a fine synchronization error. That is, the first synchronization measurement unit 160 and the second synchronization measurement unit 170 may refer to a coarse synchronization measurement unit and a fine synchronization measurement unit, respectively.

In this regard, referring to FIG. 3, the first synchronization measurement unit 160 measures a synchronization error on the basis of, among normalized envelop detection output values of the first to third signals, an average of the normalized envelop detection output value of the first signal. On the other hand, the second synchronization measurement unit 170 measures a synchronization error on the basis of averages of the normalized envelop detection output values of the first to third signals.

The memory unit 180 stores the computed propagation delay time, the minimum propagation delay time, the maximum propagation delay time, and values associated therewith.

First, coarse synchronization for frequency hop timing will be described as follows.

With respect to creation of a frequency hop pattern, the controller 150 provides the wireless communication receiver 130 with various kinds of frequency hop pattern creation parameters which are read from the memory unit 180.

In this regard, the wireless communication receiver 130 applies the frequency hop pattern creation parameters, receives a frequency hop ranging signal according to a predetermined Rx timing, and then generates an envelope detection output value. The generated envelope detector output value is delivered to the first synchronization measurement unit 160 to measure a coarse synchronization error. The first synchronization measurement unit 160 delivers an L-hop average $\eta_1$, which is a value accumulated during L hops, to the controller 150.

The controller 150 compares the L-hop average $\eta_1$ with a reference $R_{coarse}$ for determining acquisition of coarse synchronization, as described below, to determine whether coarse synchronization is acquired. Here, the reference $R_{coarse}$ for determining acquisition of coarse synchronization refers to an accumulated energy value that is obtained by normalizing a received signal upon ±0.5 hop. When the controller 150 determines that the acquisition of the coarse synchronization has failed, the controller 150 adjusts Tx timing of the wireless communication transmitter 120 by ±1 hop to reattempt to receive the frequency hop ranging signal. When the controller 150 determines that the acquisition of the coarse synchronization is successful, the controller 150 proceeds to a step of acquiring fine synchronization for frequency hop timing.

When $\eta_1 \geq R_{coarse}$, the acquisition of the coarse synchronization is successful.

When $\eta_1 < R_{coarse}$, the acquisition of the coarse synchronization has failed.

Next, fine synchronization for ranging frequency hop timing will be described as follows.

The wireless communication receiver 130 provides three envelope detection output values $z_1^2$ to $z_3^2$ for the received frequency hop ranging signal to the second synchronization measurement unit 170. The second synchronization measurement unit 170 calculates $v_k$ (k=1, 2) by applying three normalization output values $\eta_1 \sim \eta_3$ to Equation (1).

$$v_k = 2\eta_{k+1} - \eta_1 \qquad \text{[Equation (1)]}$$

In this regard, the second synchronization measurement unit 170 measures a synchronization error on the basis of averages of the normalized values. That is, the second synchronization measurement unit 170 measures a frequency hop synchronization error using $v_k$ according a criterion such as Equation (2). The second synchronization measurement unit 170 applies the measured synchronization error to ranging Tx timing to correct Tx synchronization.

The second synchronization measurement unit 170 applies $v_k$ to Equation (2) to measure a synchronization error $\varepsilon$ and delivers the measured synchronization error $\varepsilon$ to the controller 150.

[Equation 2]

when $v_1+v_2=0$, $v_1<0$, frequency hop synchronization error is measured as 0.5 hop;

when $v_1 \leq v_2$, frequency hop synchronization error is measured as $$\frac{v_1 + \sqrt{0.5(v_1^2 + v_2^2)}}{v_1 + v_2}$$

hop;

when $v_1 > v_2$, frequency hop synchronization error is measured as $$-\frac{v_2 + \sqrt{0.5(v_1^2 + v_2^2)}}{v_1 + v_2}$$

hop; and when $v_1+v_2=0$, $v_2<0$, frequency hop synchronization error is measured as −0.5 hop.

The controller 150 compares the measured synchronization error $\varepsilon$ with a reference $R_{fine}$ for determining acquisition of fine synchronization, as described below, to determine whether fine synchronization is acquired. Here, the reference $R_{fine}$ for determining acquisition of fine synchronization refers to a synchronization error that is allowable by a communication system. When the controller 150 determines that the acquisition of the fine synchronization has failed, the controller 150 adjusts Tx timing of the wireless communication transmitter 120 by the synchronization error $\varepsilon$ to reattempt to receive the frequency hop ranging signal. When the controller 150 determines that the acquisition of the fine synchronization is successful, the controller 150 proceeds to a step of acquiring Tx synchronization.

When $\varepsilon < R_{fine}$, the acquisition of the fine synchronization is successful.

When $\varepsilon \geq R_{fine}$, the acquisition of the fine synchronization has failed.

Additionally, in order to accurately acquire Tx synchronization, a signal sender reflects its own sender ID in the frequency hop ranging signal, and a ground satellite terminal determines whether the sender ID included in the frequency hop ranging signal matches the sender ID recognized in advance. When they do not match, the controller 150 reattempts coarse synchronization for frequency hop timing.

Next, synchronization for Tx frequency hop timing will be described.

Figure 5:
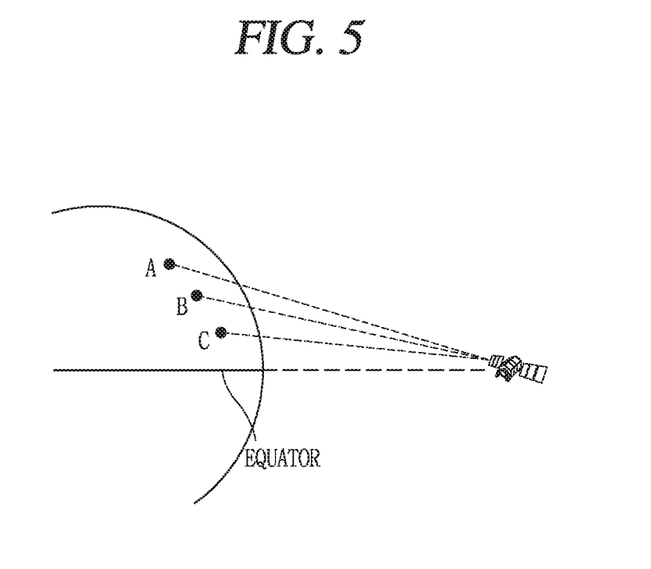
FIG. 5 is a conceptual diagram showing a principle of generating beam coverage and propagation delay according to orientation of an antenna of a satellite repeater according to the present invention.

FIG. 5 is a conceptual diagram showing a principle of generating beam coverage and propagation delay according to orientation of an antenna of a satellite repeater according to the present invention.

In this regard, a satellite communication system provides a satellite communication service to a region within a beam area of the antenna of the satellite repeater. This means that the satellite communication service is provided to a ground satellite terminal within the beam area of the antenna of the satellite repeater. The size and location of the antenna beam area vary depending on requirements of the satellite communication system. As shown in FIG. 5, the antenna of the satellite repeater over the equator may be directed to a specific region of the earth.

Referring to FIG. 5, the outermost part of an antenna beam contour with respect to the center of an antenna beam of the satellite repeater is a point at which a propagation delay time from the ground to the satellite repeater is longest or shortest. When the antenna of the satellite repeater is directed to a specific region, the variance of the propagation delay time in the antenna beam area may vary depending on the size and location of the antenna beam, but is not limited to a certain range with respect to the center of the antenna beam. For example, when a satellite terminal is located at point B, point B may be a reference point of the propagation delay time, and point A and point C may be the maximum propagation delay time and the minimum propagation delay time, respectively.

On the other hand, the location of the satellite repeater varies continuously. The propagation delay time between the ground satellite terminal and the satellite repeater may vary depending on the location of the satellite repeater. However, the location of the satellite repeater is controlled within a predetermined range by a satellite control system on the ground. This means that the influence of the variation in location of the satellite repeater on the propagation delay time is limited to a certain range. Accordingly, it is possible to calculate a maximum propagation delay time and a minimum propagation delay time that may occur in the FH-FDMA system in consideration of beam coverage directed by an antenna of the satellite repeater of the FH-FDMA system and variation in location of the satellite repeater.

Figure 6:
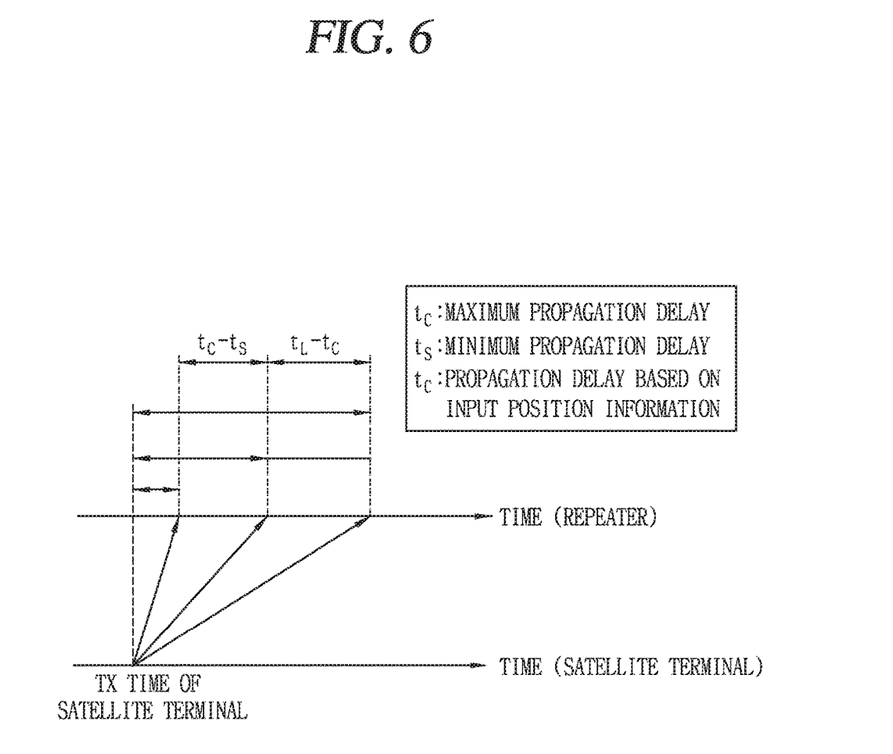
FIG. 6 is a conceptual diagram showing an error range of Tx synchronization timing according to a propagation delay time.

An error range of Tx synchronization timing according to the propagation delay time will be described in detail. In this regard, FIG. 6 is a conceptual diagram showing Tx timing according to a propagation delay time calculated by location information input by an operator of the ground satellite terminal and a Tx timing error range calculated by an allowable error range of the location information.

In this regard, in view of the satellite repeater, an FH-FDMA signal seems like several signals are frequency-hopped in units of a group formed in the format of FDMA. For a satellite communication system that operates several FH-FDMA groups, the FH-FDMA groups should operate such that the groups overlap with each other. A signal that is transmitted while unsynchronized with the network cannot enter its desired FH-FDMA group. In some cases, the signal enters another FH-FDMA group and serves as an interference signal.

As described above, a signal that is initially transmitted by the ground satellite terminal to acquire Tx network synchronization is most likely to be a signal unsynchronized with the network. The signal will have a negative impact on the entire satellite communication system. In order to solve such a problem, the system needs to be designed in consideration of an initial Tx timing error of the ground satellite terminal.

An operator of the ground satellite terminal may enter the current location information to reduce the initial Tx timing error of the ground satellite terminal. In this regard, the location information input by the operator may have a difference with actual location information. It is assumed that the difference is within a certain range. In this case, the ground satellite terminal calculates three propagation delay times using the location information input by the operator.

The first propagation delay time is a propagation delay time tc from a location where the operator has input the location information to the satellite repeater. The second propagation delay time is the longest propagation delay time $t_L$ from a location where the maximum error is applied to the location information input by the user to the satellite repeater. The third propagation delay time is the shortest propagation delay time is from a location where the minimum error is applied to the location information entered by the user to the satellite repeater. In this case, an initial Tx timing error range of the ground satellite terminal is from $-(t_C-t_S)$ to $t_L-t_C$. That is, due to an initial Tx timing error of a ranging signal that is transmitted by the ground satellite terminal to acquire initial Tx synchronization, the ranging signal may collide with the existing Tx signal that is operating according to accurate Tx synchronization.

Next, a ranging-dedicated hop group for preventing a collision between the ranging signal and the existing Tx signal will be described.

A method that has been proposed relates to a method and structure for overcoming interference that may be generated in an FH-FDMA satellite communication system that operates multiple hop groups. First, in order to prevent a collision between a frequency hop ranging signal and the existing frequency hop signal, the present invention proposes a method of designating a different ranging-dedicated hop group when a frequency hop rate is different.

When a user enters information regarding the current location of a satellite terminal and the entered information has an error within a certain range, the Tx timing error of a frequency hop ranging signal ranges from $-(t_C-t_S)$ to $t_L-t_C$. In order to prevent the possibility of interference in other hop groups, the ground satellite terminal delays its own calculated Tx timing by $t_C-t_S$ and then transmits the frequency hop ranging signal. Thus, the Tx timing error of the frequency hop ranging signal ranges from 0 to $t_L-t_S$. That is, the maximum timing error of the frequency hop ranging signal due to an initial delay is $t_L-t_S$.

Figure 7:
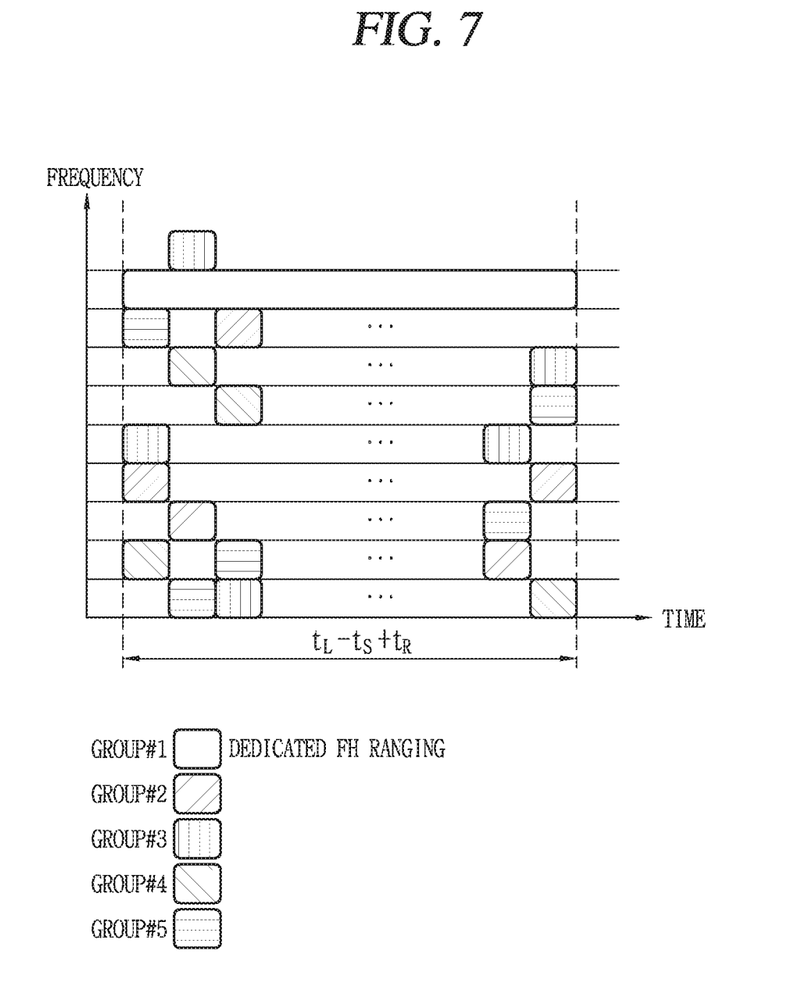
FIG. 7 shows a result of comparing frequency hops between a ranging-dedicated hop group and a general hop group according to the present invention.

A frequency hop duration time of the ranging-dedicated hop group is set as $t'_L-t'_S+t_R$ obtained by adding time $t_R$ needed for the ground satellite terminal to perform synchronization acquisition to the maximum timing error $t'_L-t'_S$ of the frequency hop ranging signal. $t'_L$ is the longest propagation delay time from the satellite repeater to the ground within an area of the antenna beam of the satellite repeater; and $t'_S$ is the shortest propagation delay from the satellite repeater to the ground within the area of the antenna beam of the satellite repeater.

In this regard, FIG. 7 shows a result of comparing frequency hops between a ranging-dedicated hop group and a general hop group according to the present invention. It is assumed that group #1 is a ranging-dedicated hop group. A general hop group changes frequency at certain intervals, but the ranging-dedicated hop group changes frequency after maintaining a frequency band during $t'_L-t'_S+t_R$. Accordingly, it can be seen that the ranging-dedicated hop group is different from the general hop group. When a frequency changing time of the ranging-dedicated hop group is designed in consideration of a timing error, and frequency orthogonality between the hop groups is maintained such that frequency overlaps may not occur between the ranging-dedicated hop group and other hop groups, the frequency hop ranging signal and other frequency hop signals, which have an initial synchronization difference therebetween, may be physically separated, thus preventing a collision between the signals.

If the ground satellite terminal is located within the antenna beam area, $t_L$ is less than or equal to $t'_L$, and $t_S$ is greater than or equal to $t'_S$.

Additionally, since the satellite repeater is not in an ideal location but within a certain spatial range, the range of the Tx synchronization timing error that has been calculated above may vary due to a location error of the satellite repeater. Accordingly, when an actual system is implemented, an initial Tx synchronization time error range should be set to a large value by considering the location error of the satellite repeater. When the timing error due to the location error of the satellite repeater is $t_E$, the frequency hop duration time of the ranging-dedicated hop group is $t'_L-t'_S+t_R+t_E$.

Next, acquisition of coarse synchronization for Tx frequency hop timing will be described.

Referring to FIG. 2, the control unit 150 instructs the wireless communication transmitter 120 to transmit a ranging signal and instructs the wireless communication receiver 130 to maintain frequency hop timing synchronization.

The wireless communication receiver 130 generates an envelope detection output value. The generated envelope detection output value is delivered to the first synchronization measurement unit 160 to measure a coarse synchronization error. The first synchronization measurement unit 160 delivers an L-hop average $\eta_1$, which is a value accumulated during L hops, to the controller 150.

The controller 150 compares the L-hop average $\eta_1$ with a reference $T_{coarse}$ for determining acquisition of Tx coarse synchronization, as described below, to determine whether coarse synchronization is acquired. Here, the reference $R_{coarse}$ for determining acquisition of coarse synchronization refers to an accumulated energy value that is obtained by normalizing a received signal upon ±0.5 hop. When the controller 150 determines that the acquisition of the coarse synchronization has failed, the controller 150 adjusts Tx timing of the wireless communication transmitter 120 by ±1 hop to reattempt the coarse synchronization. When the controller 150 determines that the acquisition of the coarse synchronization is successful, the controller 150 proceeds to a step of acquiring fine synchronization for Tx frequency hop timing.

When $\eta_1 \geq T_{coarse}$, the acquisition of the coarse synchronization is successful.

When $\eta_1 < T_{coarse}$, the acquisition of the coarse synchronization has failed.

Next, fine synchronization for Tx frequency hop timing will be described as follows.

The wireless communication receiver 130 provides three envelope detection output values $z_1^2$ to $z_3^2$ for the received frequency hop ranging signal to the second synchronization measurement unit 170. The second synchronization) measurement unit 170 calculates $v_k$ (k=1, 2) applying three normalization output values $\eta_1 \sim \eta_3$ to Equation (3).

$$v_k = 2\eta_{k+1} - \eta_1 \quad \text{[Equation 3]}$$

The second synchronization measurement unit 170 applies $v_k$ to Equation (4) to measure a synchronization error $\varepsilon$ and delivers the measured synchronization error $\varepsilon$ to the controller 150.

[Equation 4]

when $v_1+v_2=0$, $v_1<0$, frequency hop synchronization error is measured as 0.5 hop;

when $v_1 \leq v_2$, frequency hop synchronization error is measured as $$\frac{v_1 + \sqrt{0.5(v_1^2 + v_2^2)}}{v_1 + v_2}.$$

hop;

when $v_1 > v_2$, frequency hop synchronization error is measured as $$-\frac{v_2 + \sqrt{0.5(v_1^2 + v_2^2)}}{v_1 + v_2}$$

hop; and when $v_1+v_2=0$, $v_2<0$, frequency hop synchronization error is measured as −0.5 hop.

The controller 150 compares the measured synchronization error $\varepsilon$ with a reference $T_{fine}$ for determining acquisition of Tx fine synchronization, as described below, to determine whether fine synchronization is acquired. Here, the reference $T_{fine}$ for determining acquisition of Tx fine synchronization refers to an synchronization error that is allowable by a communication system. When the controller 150 determines that the acquisition of the fine synchronization has failed, the controller 150 adjusts Tx timing of the wireless communication transmitter 120 by the synchronization error $\varepsilon$ to reattempt to receive the frequency hop ranging signal. When the controller 150 determines that the acquisition of the fine synchronization is successful, the controller 150 declares completion of the synchronization acquisition.

When $\varepsilon < T_{fine}$, the acquisition of the fine synchronization is successful.

When $\varepsilon \geq T_{fine}$, the acquisition of the fine synchronization has failed.

Additionally, in order to accurately acquire Tx synchronization, the ground satellite terminal reflects its sender ID in a frequency hop ranging signal and determines whether the sender ID matches a sender ID included in the frequency hop ranging signal. When they do not match, the controller 150 reattempts coarse synchronization for Tx frequency hop timing.

As described above, functions and procedures performed by sub-elements of the wireless communication transmitter 120, the wireless communication receiver 130, the controller 150, the first synchronization measurement unit 160, and the second synchronization measurement unit 170 may be utilized in a method of controlling Tx timing of a ranging signal in a satellite communication terminal that will be described below.

Figure 8:
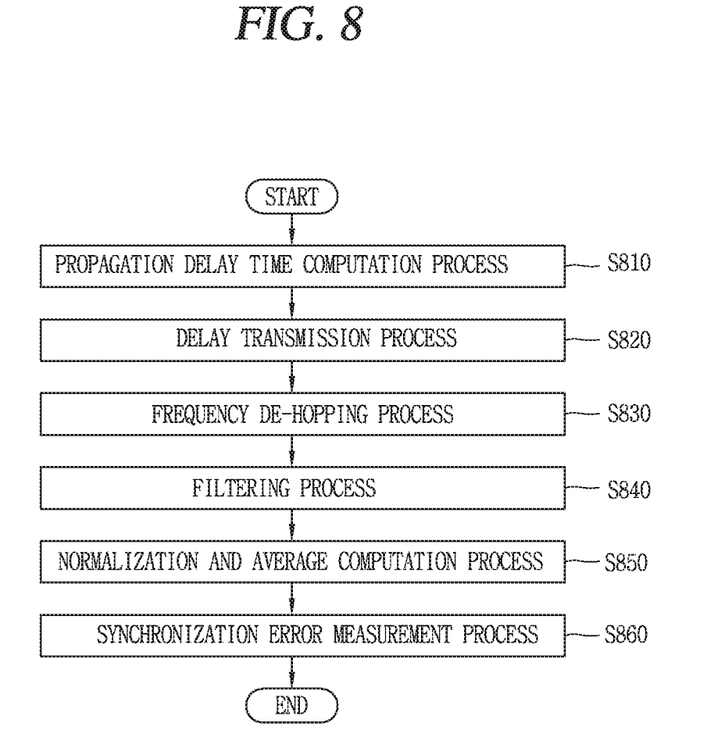
FIG. 8 shows a method of controlling Tx timing of a ranging signal in a satellite communication terminal according to the present invention.

In this regard, FIG. 8 shows a method of controlling Tx timing of a ranging signal in a satellite communication terminal according to the present invention.

The method of controlling Tx timing of a ranging signal includes a propagation delay time computation process S810, a delay transmission process S820, a frequency dehopping process S830, a filtering process S840, a normalization and average computation process S850, and a synchronization error measurement process S860.

The propagation delay time computation process S810 includes computing a propagation delay time from a location of a satellite communication terminal, which is input by an operator of the ground satellite terminal, to a satellite repeater and the minimum propagation delay time and the maximum propagation delay time according to an allowable error range of the location.

The delay transmission process S820 includes transmitting a ranging signal after a certain time upon the transmission of the ranging signal through a ranging-dedicated hop group in order to avoid collisions between the ranging signal and other signals. Here, the certain time may be a difference between a maximum propagation delay time and a minimum propagation delay time, which is calculated by the allowable error range of the location input by an operator of the ground satellite terminal.

Meanwhile, the frequency dehopping process S830 to the synchronization error measurement process S860 are processes for avoiding a collision between ranging signals.

The frequency dehopping process S830 includes frequency-dehopping a synchronization signal transmitted by the satellite repeater or a satellite.

The filtering process S840 includes pre-filtering and post-filtering a first signal corresponding to the frequency-dehopped synchronization signal to acquire a second signal and a third signal.

The normalization and average computation process S850 includes normalizing envelop detection values of the first to third signals using a sum of the envelop detection values of the second and third signals and computing averages of the normalized values.

The synchronization error measurement process S860 includes measuring a synchronization error on the basis of the averages.

Components other than the signal transmitter in the aforementioned frequency hop synchronization acquisition system may be applied to initial Rx synchronization acquisition and Rx synchronization correction through the reception of the frequency hop ranging signal.

As described above, through the method and structure proposed in the present invention, the satellite communication terminal may acquire initial Tx synchronization timing in an FH-FDMA satellite communication system that operates multiple hop groups.

According to the embodiments of the present invention, it is possible for the satellite communication terminal to avoid collisions between the ranging signal and other Tx signals in the FH-FDMA satellite communication system that operates multiple hop groups.

According to embodiments of the present invention, it is also possible to apply components other than the signal transmitter in the frequency hop synchronization acquisition system to initial Rx synchronization acquisition and Rx synchronization correction through the reception of the frequency hop ranging signal.

According to at least one embodiment of the present invention, it is possible for the satellite communication terminal to avoid collisions between the ranging signal and other Tx signals in the FH-FDMA satellite communication system that operates multiple hop groups.

According to at least one embodiment of the present invention, it is also possible to avoid a collision between ranging signals of a plurality of satellite communication terminals. A method and structure for acquiring Tx/Rx frequency hop timing synchronization of the ground satellite terminal in the FH-FDMA satellite communication system that operates multiple hop groups may be utilized.

Meanwhile, the wireless communication transmitter 120, the wireless communication receiver 130, the controller 150, the first synchronization measurement unit 160, and the second synchronization measurement unit 170 may be implemented in hardware, software, and a combination thereof. In addition, sub-elements of the wireless communication transmitter 120, the wireless communication receiver 130, the controller 150, the first synchronization measurement unit 160, and the second synchronization measurement unit 170 may also be implemented in hardware, software, and a combination thereof.

For a software implementation, procedures and functions described in the specification may be implemented together with separate software modules, each of which performs at least one of the functions and/or operations. Software code can be implemented with a software application written in any suitable programming language. Also, the software code may be stored in a memory and executed by a controller or processor.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of acquiring frequency hop timing synchronization, which is performed by a ground satellite terminal, the method comprising:
    transmitting a ranging signal after a certain time in order to avoid collisions between the ranging signal and an existing transmission signal that is operating according to an accurate transmission synchronization;
    receiving the ranging signal that was transmitted by the ground satellite terminal to determine whether synchronization is acquired;
    adjusting a transmission timing of a wireless communication transmitter to reattempt the synchronization, when an acquisition of the synchronization has failed; and
    transmitting another ranging signal based on the adjusted transmission timing,
    wherein the receiving the ranging signal that was transmitted by the ground satellite terminal to determine whether synchronization is acquired comprises:
    measuring a synchronization error using averages of a normalized envelope detection output, and
    wherein the measuring of a synchronization error comprises:

a first synchronization measurement process of determining whether coarse synchronization is acquired when, among the normalized envelope detection outputs of the first to third signals, an average ($\eta_1$) of the normalized envelope detection output of the first signal is greater than a reference for determining whether the coarse synchronization is acquired;

calculating $v_1$ ($=2\eta_2-\eta_1$) and $v_2$ ($=2\eta_3-\eta_1$) using the averages ($\eta_1, \eta_2, \eta_3$) of the normalized envelope detection outputs of the first to third signals when the coarse synchronization is acquired;

measuring the synchronization error using $v_1$ and $v_2$ as follows:
when $v_1+v_2=0$, $v_1<0$, frequency hop synchronization error is measured as 0.5 hop;
when $v_1 \leq v_2$, frequency hop synchronization error is measured as $$\frac{v_1 + \sqrt{0.5(v_1^2 + v_2^2)}}{v_1 + v_2}$$

hop;
when $v_1 > v_2$, frequency hop synchronization error is measured as $$-\frac{v_2 + \sqrt{0.5(v_1^2 + v_2^2)}}{v_1 + v_2}$$

hop; and
when $v_1+v_2=0$, $v_2<0$ frequency hop synchronization error is measured as −0.5 hop; and a second synchronization measurement process of determining that fine synchronization is acquired when the measured synchronization error is smaller than an allowable synchronization error, which is a reference for determining whether the fine synchronization is acquired.

2. The method of claim 1, wherein a hop duration time of a ranging-dedicated hop group is obtained by adding an error in location of a satellite repeater to a difference between a longest propagation delay time and a shortest propagation delay time between the satellite repeater and the ground located within an antenna beam area of the satellite repeater and further adding a time needed to acquire synchronization of the ground satellite terminal and further adding a timing error due to the position error of a satellite repeater.

3. The method of claim 1, wherein the certain time is a difference between the maximum propagation delay time and the minimum propagation delay time, which is calculated according to an allowable error range at the location input by an operator of the ground satellite terminal.

4. The method of claim 1, wherein the receiving the ranging signal that was transmitted by the ground satellite terminal to determine whether synchronization is acquired further comprises:
frequency-dehopping a downlink synchronization signal;
pre-filtering and post-filtering a first signal corresponding to the frequency-dehopped synchronization signal to acquire a second signal and a third signal;
detecting envelopes of first to third signals; and
normalizing envelope detection outputs of the first to third signals using a sum of the envelope detection outputs of the second and third signals,
wherein the measuring of the synchronization error uses the averages of the normalized envelope detection outputs of the first to third signals.

5. A satellite communication terminal comprising:
a controller configured to compute certain time, which is a difference between a maximum propagation delay time and a minimum propagation delay time according to an allowable error range at a location input by an operator of a ground satellite terminal to determine whether coarse synchronization is acquired and whether fine coarse synchronization is acquired and to adjust a transmission timing of a wireless communication transmitter to reattempt the synchronization when an acquisition of the synchronization has failed; and
a wireless communication device configured to transmit a ranging signal in order to avoid collisions between the ranging signal and an existing transmission signal that is operating according to an accurate transmission synchronization and to transmit another ranging signal based on the adjusted transmission timing and to receive the ranging signal that was transmitted by the ground satellite terminal to determine whether synchronization is acquired, wherein the controller comprises:
a first synchronization measurement unit configured to determine whether coarse synchronization is acquired when, among normalized envelope detection outputs of first to third signals, an average ($\eta_1$) of the normalized envelope detection output of the first signal is greater than a reference for determining whether the coarse synchronization is acquired; and
a second synchronization measurement unit configured to calculate $v_1$ ($=2\eta_2-\eta_1$) and $v_2$ ($=2\eta_3-\eta_1$) using the averages ($\eta_1, \eta_2, \eta_3$) of the normalized envelope detection outputs of the first to third signals when the coarse synchronization is acquired, measure the synchronization error using $v_1$ and $v_2$ as follows:
when $v_1+v_2=0$, $v_1<0$, frequency hop synchronization error is measured as 0.5 hop;
when $v_1 \leq v_2$, frequency hop synchronization error is measured as $$\frac{v_1 + \sqrt{0.5(v_1^2 + v_2^2)}}{v_1 + v_2}$$

hop;
when $v_1 > v_2$, frequency hop synchronization error is measured as $$-\frac{v_2 + \sqrt{0.5(v_1^2 + v_2^2)}}{v_1 + v_2}$$

hop; and
when $v_1+v_2=0$, $v_2<0$ frequency hop synchronization error is measured as −0.5 hop, and
determine that fine synchronization is acquired when the measured synchronization error is smaller than an allowable synchronization error, which is a reference for determining whether the fine synchronization is acquired.

6. The method of claim 1, wherein the ranging signal is a frequency hop signal transmitted based on a ranging-dedicated hop group.

7. The method of claim 4, wherein the pre-filtering acts on a first portion of the first signal and the post-filtering acts on a second portion of the first signal, the first portion and the second portion being different time periods of a hop.

* * * * *